No. 839,111. PATENTED DEC. 25, 1906.
R. A. CHAMBERS.
APPARATUS FOR TESTING PNEUMATIC TOOLS.
APPLICATION FILED JULY 23, 1906.
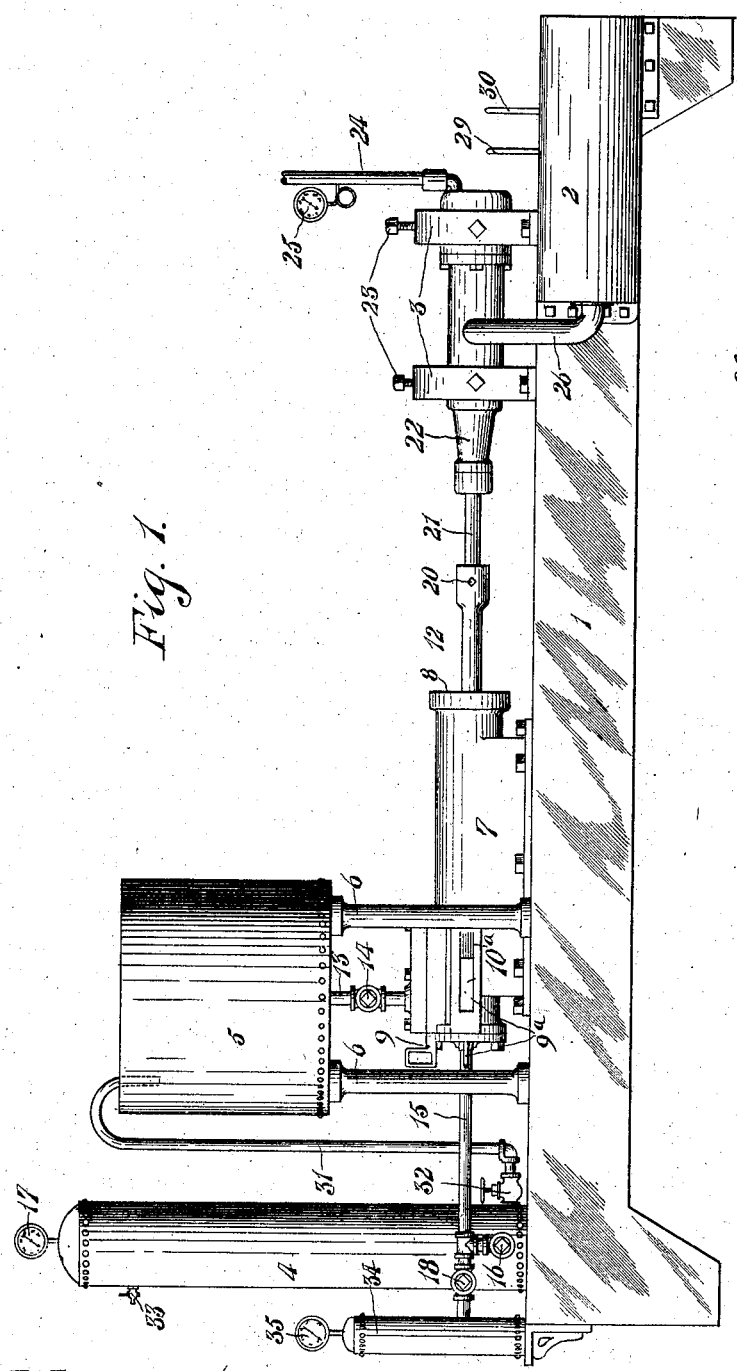
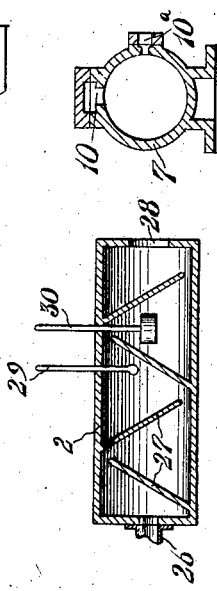
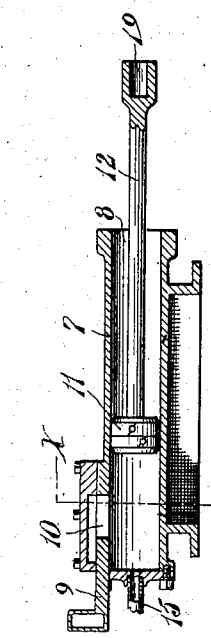
Witnesses
Inventor
Robert A. Chambers.

UNITED STATES PATENT OFFICE.

ROBERT ALLISON CHAMBERS, OF NEW GLASGOW, NOVA SCOTIA, CANADA.

APPARATUS FOR TESTING PNEUMATIC TOOLS.

No. 839,111. Specification of Letters Patent. Patented Dec. 25, 1906.

Application filed July 23, 1906. Serial No. 327,294.

*To all whom it may concern:*

Be it known that I, ROBERT ALLISON CHAMBERS, of the town of New Glasgow, Province of Nova Scotia, and Dominion of Canada, have invented certain new and useful Improvements in Apparatus for Testing Pneumatic Tools, of which the following is a full, clear, and exact description.

My invention relates to apparatus for testing pneumatic tools and similar devices; and its object is to provide a means for subjecting the tools to resistances and stresses which are the equivalents of those met with in actual operation. To accomplish this object, I provide a frame supporting a testing-cylinder and provided with means for securing the tool to be tested. Connected to the cylinder are an open reservoir containing water and two closed tanks containing air. Adjacent the pneumatic tool is a chamber provided with pressure and temperature recording means. Gages are provided for registering the pressure of air supplied to the tool and also the pressure of air in the two closed tanks. Check-valves are placed between the cylinder and the reservoir and between the cylinder and each of the tanks. Adjustable gates are further provided for the cylinder, whereby its functions may be regulated to suit the class of tool to be tested.

Referring to the drawings which illustrate my invention, Figure 1 is a side elevation of the device, showing the relative position of the parts. Fig. 2 is a vertical longitudinal section through the center of the cylinder. Fig. 3 is a vertical longitudinal section through the center of the exhaust-muffler. Fig. 4 is a cross-sectional view of the cylinder on the line X X of Fig. 2.

In the above-defined figures, 1 designates the frame of the machine, one end of which carries an exhaust-muffler 2 and a pair of adjustable clamps 3 and the other end a closed cylindrical tank 4 and an open reservoir 5, supported on a plurality of columns 6. Toward the center the frame 1 carries a cylinder 7, open at the end 8. The cylinder 7 is provided with adjustable gates 9 and 9$^a$, which open or close the ports 10 and 10$^a$ in the cylinder. Inside the cylinder 7 is a piston 11, which when operated by the piston-rod 12 retreats and allows water from the tank 5 to enter the cylinder through the pipe 13 and check-valve 14. On the forward stroke of the piston the water is allowed to escape through the port 10$^a$ on the side of the cylinder until the piston passes this port. When the piston has passed the port 10$^a$, the resistance to its forward motion, due to the water column, will cause an impact which forces the water through the pipe 15 past the check-valve 16 and into the tank 4, compressing the air therein, which pressure is registered by the gage 17. These repeated impacts correspond to the blows when in operation. The vacuum caused in the tank 34 by the return stroke of the piston 11 is maintained by the check-valve 18 and registered by the gage 35. The end of the piston-rod 12 is hollow at 19 and provided with a set-screw 20 for securing the end of a cutter or other member 21, actuated by the pneumatic tool 22, which is firmly set up in the clamps 3 by means of adjusting-screws 23. The supply-pipe 24 of the tools 22 is provided with a pressure-gage 25, and the exhaust-pipe 26 discharges into the muffler 2. The muffler 2 contains a plurality of angularly-disposed baffle-plates 27, which cause the exhaust to be equally distributed throughout the muffler 2 before it escapes through the orifice 28. A thermometer 29 and a water or mercury column 30 are inserted into the muffler 2 to ascertain the temperature and pressure of the exhaust. A pipe 31, provided with a valve 32, leads from the bottom of the tank 4 into the reservoir 5, so that when the test is finished the valve 32 may be opened and the pressure of air in the tank 4 utilized to return the water to the reservoir 5. As a further auxiliary I provide an air-cock 33 in the tank 4. I also provide a closed tank 34, attached to the pipe 15 beyond the check-valve 18, said tank provided with a vacuum-gage 35. The return stroke of the piston creates a partial vacuum in the tank 34, which vacuum corresponds to the resistance to the return motion of the tool-cutter 21 experienced in actual operation.

The operation of my device consists, briefly, in registering the pressure of air supplied to the tool, the air-pressure and vacuum created in the tanks 4 and 34, and also the pressure, volume, and temperature of the air after it has passed through the tool.

The pneumatic tool 22, which is rigidly fixed by the clamps 3, operates the piston 11 through the medium of its cutter 21, which is fixed to the piston-rod 12 by a set-screw 20. The commencement of the forward stroke of the piston 12 creates a partial vacuum in the tank 34, which vacuum is maintained by the check-valve 18 and corresponds approximately to the resistance met with on the return stroke of the cutter 21 in actual practice. The length of the vacuum-stroke may be regulated by the gate 9 to accord with the conditions under which the tool would normally operate. During the remainder of the forward stroke the cylinder fills with water from the reservoir 5. At the commencement of the return stroke the check-valve closes and the water in the cylinder is forced out through the port $10^a$ until the piston passes this port. The sudden resistance to the forward movement of the piston caused by the imprisoning of the water in the cylinder 7 is the equivalent of the impact of the cutter in actual operation. The continuous repetition of these resistances or impacts compresses the air in the tank 4 through the medium of the water in the cylinder, a small portion of which is forced past the check-valve 16 and into the tank 4 at each forward stroke of the piston. The air-pressure thus caused is registered by the gage 17 and represents the momentum or efficiency of the tool. The length of stroke during which the water is forced into the tank 4 may be regulated by means of the gate $9^a$. The exhaust from the tool 22 is led into a chamber 2, containing a plurality of baffle-plates 27, which diffuse the jet of exhaust fluid, rendering its density uniform, so that its temperature and pressure may be accurately registered by the gages 29 and 30 before it escapes through the orifice 28. When the test is completed, the water in the tank 4 may be returned to the reservoir 5 by opening the valve 32 and allowing the air-pressure in the tank to force the water through the pipe 31.

The advantages of this device are that a pneumatic tool may be subjected to all resistances and stresses experienced in actual operation and such resistances accurately measured and compared with the amount of power required to overcome them, thereby furnishing a reliable means for gaging the power and efficiency of the tool and for setting the valves of the same.

Having thus described my invention so that the same may be readily understood by those skilled in the art to which it appertains, what I claim, and desire to secure by Letters Patent, is—

1. In a device of the class described, a cylinder, a piston therefor, adjustable means for introducing a column of water into said cylinder, a compressor-tank, means connecting said compressor-tank and cylinder, a reciprocating tool attached to said piston, and means for registering the impact of the piston against a column of water within the cylinder.

2. In a device of the class described, a cylinder, a piston therefor, an adjustable inlet-port on one side of said cylinder, an adjustable outlet-port on the opposite side of said cylinder, a compressor-tank, means connecting said compressor-tank and cylinder, a reciprocating tool connected to said piston, and means for registering the impact of the forward stroke of the piston.

3. In a device of the class described, a cylinder, a piston therefor, an adjustable inlet-port at one side of said cylinder, an adjustable outlet-port on the opposite side of said cylinder, a compressor-tank, means connecting said compressor-tank and cylinder, a reciprocating tool connected to said piston, means for measuring the impact of the forward stroke of the piston, and means for measuring the return stroke of the piston.

4. In a device of the class described, a cylinder, a piston therefor, adjustable means for introducing a column of water into said cylinder, an adjustable outlet-port, a compressor-tank, means connecting said compressor-tank and cylinder, a vacuum-tank, means connecting said vacuum and cylinder, a reciprocating tool connected to said piston, means for measuring the impact of the forward stroke of said piston, means for measuring the return stroke of the piston, and means for measuring the energy required by said reciprocating tool.

5. A device of the class described comprising a cylinder, a piston therefor, an adjustable inlet-port on one side of said cylinder, an adjustable outlet-port on the opposite side of the cylinder, a compressor-tank, a vacuum-tank, connections between said tanks and cylinder, a reciprocating tool connected to said piston, means for measuring the energy supplied to said tool, and means for measuring the forward and return strokes of said piston.

In witness whereof I have hereunto set my hand in the presence of two witnesses.

ROBERT ALLISON CHAMBERS.

Witnesses:
   STUART R. W. ALLEN,
   C. W. TAYLOR.